United States Patent [19]

Hunter

[11] Patent Number: 4,572,355

[45] Date of Patent: Feb. 25, 1986

[54] COUPLING ASSEMBLY

[75] Inventor: Burnis L. Hunter, Mableton, Ga.

[73] Assignee: Sewell Plastics, Inc., Atlanta, Ga.

[21] Appl. No.: 657,135

[22] Filed: Oct. 3, 1984

[51] Int. Cl.⁴ .............................................. B65G 25/00
[52] U.S. Cl. ............................ 198/803.12; 198/803.7
[58] Field of Search .............. 198/651, 377, 478, 477,
198/479, 695; 294/93, 94; 269/48.1; 425/525,
526, 534, 535

[56] References Cited

U.S. PATENT DOCUMENTS

| | | | |
|---|---|---|---|
| 2,338,032 | 12/1943 | Friden | 198/651 |
| 3,958,685 | 5/1976 | McDonald et al. | 198/377 |
| 4,082,175 | 4/1978 | Gibbemeyer | 198/377 |
| 4,086,999 | 5/1978 | McDonald | 198/377 |
| 4,435,146 | 3/1984 | Wiatt et al. | 198/695 X |

Primary Examiner—Joseph E. Valenza
Assistant Examiner—Darrell G. Dayoan
Attorney, Agent, or Firm—Barnes & Thornburg

[57] ABSTRACT

A coupling assembly for a conveyor used in conjunction with a blow moulding apparatus is adapted to engage parisons of a plurality of preselected sizes. The conveyor includes a plurality of carriers of coupling assemblies while each coupling assembly includes an elongated member passing through a carrier. A plurality of parison engaging resilient rings are supported with respect to one end of the elongated member in axially displaced relation to each other. Each parison engaging ring is dimensioned differently from the other parison engaging ring situated on the elongated member to engage a parison of a preselected size.

10 Claims, 3 Drawing Figures

COUPLING ASSEMBLY

The present invention relates generally to power-driven conveyors which include item holders adapted to receive items of various pre-selected sizes, and particularly to such conveyor systems for conveying separate unit loads in progression through an oven or similar area of heating prior to the introduction of the unit load to a subsequent machine for further processing.

The present invention is particularly suited for conveying an injection molded preform or parison through a reheating oven where the parison is heated in a uniform manner to an appropriate temperature for blow molding. The parison is then delivered to a blow molding machine which, after placing the parison within a mold cavity, compressed air or other gas is forced at high pressure to the inside of the parison causing it to enlarge and conform to the interior wall surface of the mold to form a bottle or other similar article. The present invention is directed specifically to a coupling assembly for handling the parisons as they move through the reheating oven.

An example of a conveyor used to move parisons or preforms through a reheating oven is disclosed in U.S. Pat. No. 3,958,685. The illustrated preferred embodiment of the present invention is intended for use in connection with such a conveyor. As illustrated in that patent, the conveyor includes a plurality of carrier bars supported at each end by a pair of rollers. Each carrier bar is connected at each end by a drag link to a conveyor chain which moves the carrier bars in a enerally horizontal path through an oven. The conveyor chain is moved by a drive and idler sprocket o either end of the oven. Each of the carrier bars includes a plurality of coupling assemblies for coupling parisons to be carried through the reheating oven. In a typical commercial installation of such an apparatus, sixty four or more carrier bars would be provided on a single conveyor and each carrier bar would be provided with four coupling assemblies.

Various configurations have been proposed for the coupling assemblies used on such an apparatus. The coupling assembly disclosed in U.S. Pat. No. 3,958,685 includes three circumferentially spaced detents which engaged the lower edge of the pilfer-proof ring on the preformed finish of the parison. A similar coupling assembly was disclosed in U.S. Pat. No. 4,116,325 where the detents were in the form of pivoting grasping arms adapted to engage the preform on the lower outside of the pilfer-proof ring.

Yet another coupling assembly was disclosed in U.S. Pat. No. 4,116,325 which included an elastomeric ring which could be axially compressed or decompressed so as to cause it to change its diameter and thereby engage or disengage from the internal diameter of the parison neck opening. Yet another coupling assembly is disclosed in U.S. Pat. No. 4,082,175 in which a resilient garter spring is cammed between two circumferential sloping surfaces to undergo hoop expansion and contraction and thereby engage and disengage the interior surface of the parison opening.

Each of the previously mentioned coupling assemblies is specifically designed to receive a parison of a particular size. In practice, the size of the preformed finish was uniform and typically 28 mm. It has been recently recognized that it may be desirable, on occasion, to quickly change from one type of parison to another type of parison having a different size finish. With the various coupling assemblies previously mentioned, one would be faced with the costly and time consuming job of changing all 256 or more assemblies as each assembly is adapted to handle only a single size of finish. A change from a 28 mm finish to a 38 mm finish would not be possible with any of the previously discussed coupling assemblies. In recognition of this need to quickly change size of parisons, it has been proposed to provide carriers with exchangeable coupling assemblies as disclosed in U.S. Pat. No. 4,456,447. While such a quick change coupling would decrease the time for changeover between parison finish sizes, it would still require maintaining a significant inventory of such quick change couplings and require significant labor to change all 256 or more assemblies.

In accordance with the present invention, a coupling assembly is provided which is adapted to engage parisons of a plurality of preselected sizes. The coupling assembly is intended to be used on a conveyor which includes a plurality of carriers for such coupling assemblies and is intended for use particularly with reheating ovens and other blow molding machinery. The coupling assembly comprises an elongated member passing through a carrier and a plurality of parison engaging means supported with respect to one end of the elongated member in axially displaced relation to each other, each parison engaging means being dimensioned differently from the other parison engaging means situated on the elongated member so as to engage parisons of preselected sizes.

In the preferred embodiment, each parison engaging means comprises a cup having a sloped outer lip and a plug partially received within the cup having a shoulder sloped oppositely of the cup outer lip. A resilient member is provided between the sloped shoulder and lip and radially expands in response to an axial movement of the plug relative to the cup. An axial outside surface of a cup of one of the parison engaging means abuts the axial surface of a plug of an adjacent parison engaging means. The axially adjacent parison engaging means are sized such that the engaging means situated closest to the carrier is radially larger than the parison engaging means situated more remotely from the carrier. In the preferred embodiment a pair of such parison engaging means are supported by a single rod, each rod being operable to actuate both of the parison engaging means.

In a commercial embodiment of the present invention, the parison engaging means situated closest to the carrier would be adapted to engage with a 38 mm finish while the engaging means more remote from the carrier would be adapted to engage a 28 mm finish. These various features of a coupling assembly in accordance with the present invention permit the changeover from one size of parison to another size of parison without any change in conveyor machinery whatsoever. This dramatically reduces the time required for a production line change and eliminates any need for maintaining an inventory of alternative quick-change coupling assemblies. Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

Figure 1:
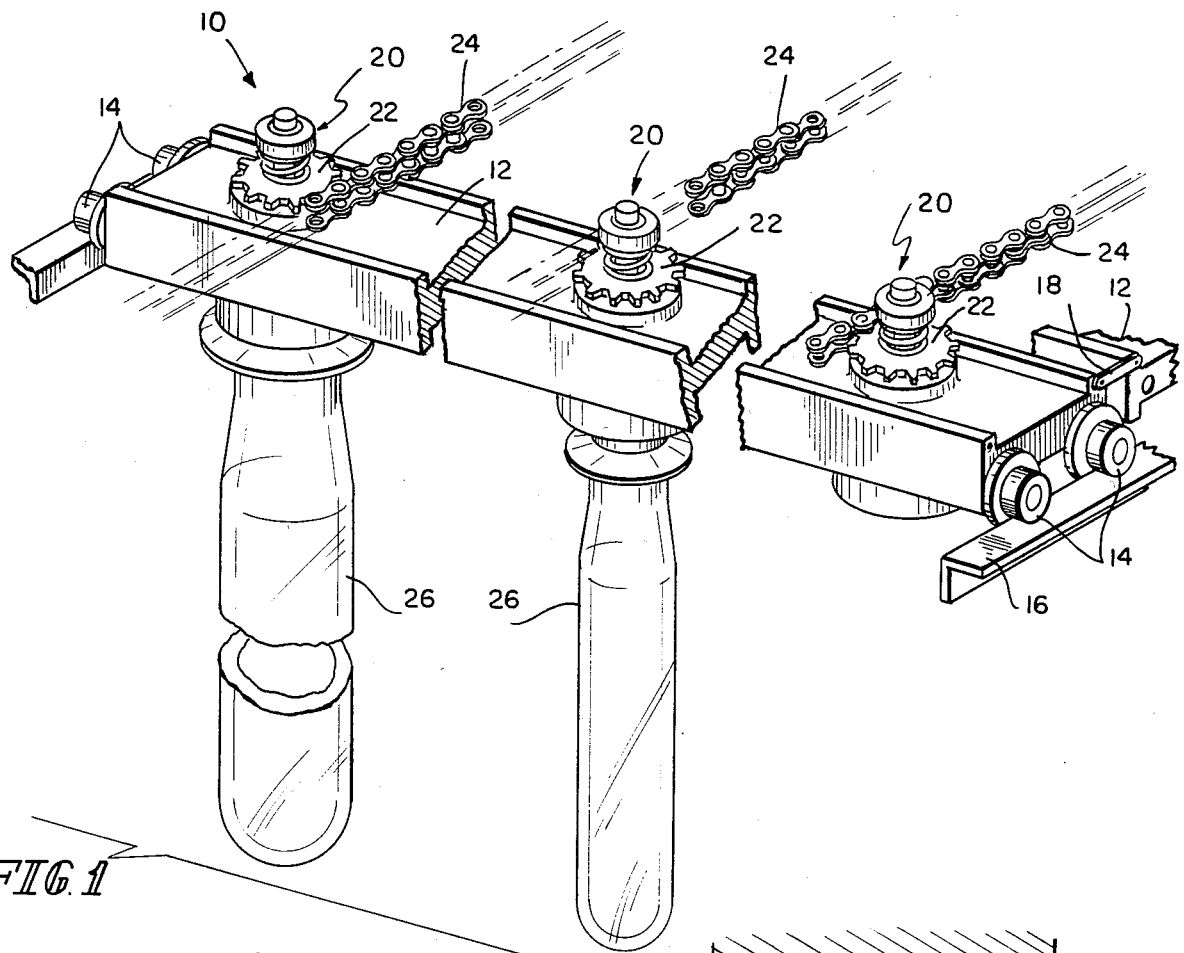
FIG. 1 is a perspective view of a single carrier of a conveyor having at least three coupling assemblies situated thereon.

A portion of a conveyor 10 used in conjunction with a reheating oven and blow molding apparatus is shown in FIG. 1 to include a plurality of carriers 12. Each carrier is supported by two pairs of wheels 14 on a supporting frame or rail 16 of the oven 10. Each of the carriers 12 are coupled to adjacent carriers by pivotal links 18 and are propelled through the oven by means not illustrated but conventional and disclosed, for example, in U.S. Pat. No. 3,958,658.

Each of the carriers 12 includes a plurality of coupling assemblies 20. The coupling assemblies include on an upper portion above the carrier 12 a sprocket 22 which is engaged with a chain 24. The motion of the carriers 12 and chains 24 are such that the carriers 12 advance in a stepwise fashion through the oven while the sprocket maintains the coupling assembly 20 in a continuous rotational or twirling motion about the vertical axis of each coupling assembly 20.

Figures 2, 3:
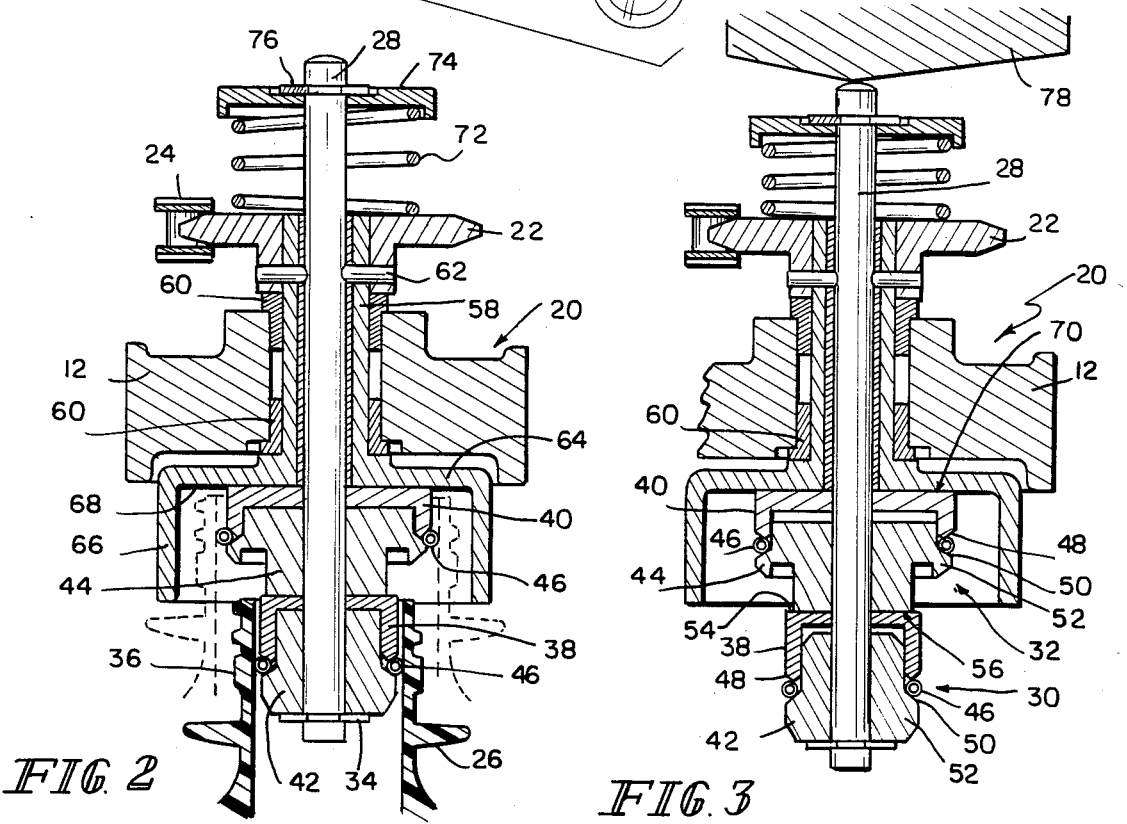
FIG. 2 is a sectional view of a coupling assembly in accordance with the present invention with a parison engaged on the lower parison engaging means.
FIG. 3 is a sectional view of a coupling assembly in accordance with the present invention showing its interaction with a cam causing displacement of the actuator rod for releasing a parison from the coupling assembly.

The coupling assemblies 20 of the present invention are illustrated in FIGS. 2 and 3 in more detail and are shown to comprise in elongated member 28, preferably a rod, passing vertically through the carrier 12. Two parison engaging means 30 and 32 are coaxially positioned on rod 28 and retained by a retaining ring 34 at the lower end of rod 28. The lowermost parison engaging means 30 is dimensioned to accept a parison 26 having a smaller finish 36, for example, 28 mm. The upper parison engaging means 32 is dimensioned to engage a parison (shown in phantom in FIG. 2) having a larger finish, for example, 38 mm.

The two parison engaging means 30 and 32 each include a downwardly opening cup member 38 and 40 respectively. A plug member 42 and 44 are partially received within cups 38 and 40 respectively. A resilient ring member 46 is positioned between the lip of each cup and the adjacent plug member. The lip of the cups 38 and 40 each include a sloped outer surface 48 which cooperates with the sloped surface 50 of shoulder 52 on each plug member to define a V shaped groove which receives the resilient ring 46. The plugs 42 and 44 are axially movable within the cups 38 and 40 between the two positions shown in FIGS. 2 and 3. An axially outer or top surface 54 of lower cup 38 abuts the lowermost axial surface 56 of plug 44. While plug 44 and cup 38 are illustrated to be two separate members, they could be unitarily constructed as a single member.

The elongated rod 28 is vertically displaceable within a sleeve or hollow stem 58 which is supported by bearings 60 for rotation in carrier 12. The hollow stem 58 is secured to sprocket 22 by a fastener 62 such as a screw or pin so as to cause rotation of the stem 58 as a result of the motion of the drive chain 24. The lower end of hollow stem 58 unitarily includes a radially extending flange portion 64 at the outer rim of which is a depending skirt portion 66. The skirt portion 66 depends far enough to act as a heat shield to protect the neck or finished portion 36 of the parison from the heating effects so as to prevent distortion of the finish which is desirably maintained at the originally molded dimensions so as to favorably cooperate with a closure for the article to be molded. A lower axial surface 68 of flange 64 contacts an upper axial surface 70 of cup member 40 with sufficient frictional engagement so as to ensure rotation of the cup member 40 with the hollow stem 58 and flange 64. Likewise, the frictional forces between cup 40 and plug 44, plug 44 and cup 38, and cup 38 and plug 42 are such as to ensure common rotation of both parison engaging means 30 and 32 with the rotation of sprocket 22.

The elongated rod 28 is biased upwardly by compression spring 72 positioned between sprocket 22 and flanged washer 74 which in turn is retained by retaining ring 76. The spring constant of compression spring 72 is such that, in the absence of any other applied force, the plugs 42 and 44 are bottomed out within cups 38 and 40 as shown in FIG. 2. In this position, the resilient rings 46 are caused to undergo hoop expansion and move radially outward to a position where an outer surface can contact an inner surface of the mouth of a parison 26 with sufficient force so as to retain the parison on the coupling assembly 20. To release the parison 26 from the coupling assembly 20, a downward axial force is applied to the elongated member 28, for example, by a cam member 78 as shown in FIG. 3, the cam member 78 being positioned desirably at the output end of the conveyor 10 such that all coupling assemblies 20 on a single carrier 12 are actuated simultaneously as the carrier 12 is advanced in stepwise fashion to a release position.

While the illustrated preferred embodiment shows the incorporation of two parison engaging means 30 and 32, it will be appreciated that one or more additional similar parison engaging means could be axially situated such that a lowermost engaging means is dimensioned to receive a parison of the smallest size while the uppermost parison engaging means is dimensioned to receive a parison of the largest size. Further, the presence of such a plurality of parison engaging means on a single coupling assembly permits the operator of such an apparatus to change from one size of parison to another without any change in conveyor apparatus whatsoever.

Although the invention has been described in detail with reference to the illustrated preferred embodiment and with specific examples of dimensions, variations and modifications exist within the scope and spirit of the invention as described and as defined in the following claims.

I claim:

1. A coupling assembly for a conveyor used in conjunction with blow molding apparatus and adapted to engage parisons of a plurality of preselected sizes, the conveyor including a plurality of carriers of coupling assemblies, each coupling assembly comprising: an elongated member passing through a carrier, and a plurality of parison engaging means supported with respect to one end of the elongated member in axially displaced relation to each other, each parison engaging means being dimensioned differently from the other parison engaging means situated on the elongated member to engage a parison of a preselected size.

2. The coupling assembly of claim 1 wherein each parison engaging means includes a resilient member radially expansible to contact an inner surface of a parison, the resilient member contacting a pair of adjacent surfaces axially movable to cause the radial expansion of the resilient member.

3. The coupling assembly of claim 2 wherein each parison engaging means further comprises a cup having a sloped outer lip, and a plug partially received within the cup having a shoulder sloped oppositely the cup outer lip, the resilient member being situated between the sloped shoulder and lip.

4. The coupling assembly of claim 3 wherein an axially outside surface of a cup of one parison engaging means abuts an axial surface of a plug of an adjacent parison engaging means.

5. The coupling assembly of claim 2 wherein the resilient member is self-biasing away from engagement with a parison, and the coupling assembly further comprises biasing means situated on the elongated member and opposite the parison engaging means for biasing the engaging means toward a parison engaging position.

6. The coupling assembly of claim 2 wherein each of said pair of adjacent surfaces comprises an inclined surface for wedging the resilient member outward as the resilient member undergoes hoop expansion 7. The coupling assembly of claim 1 wherein the parison engaging means situated closest to said carrier is radially larger than any other parison engaging means axially situated with respect thereto.

8. The coupling assembly of claim 1 wherein the elongated member comprises a rod and wherein only a pair of parison engaging means are supported by each rod.

9. The coupling assembly of claim 1 further comprising shielding means surrounding the elongated member for shielding at least a top opening of a parison coupled thereto.

10. The coupling assembly of claim 9 wherein the shielding means comprises a skirt surrounding the parison engaging means.

* * * * *